United States Patent Office 2,813,235
Patented Nov. 12, 1957

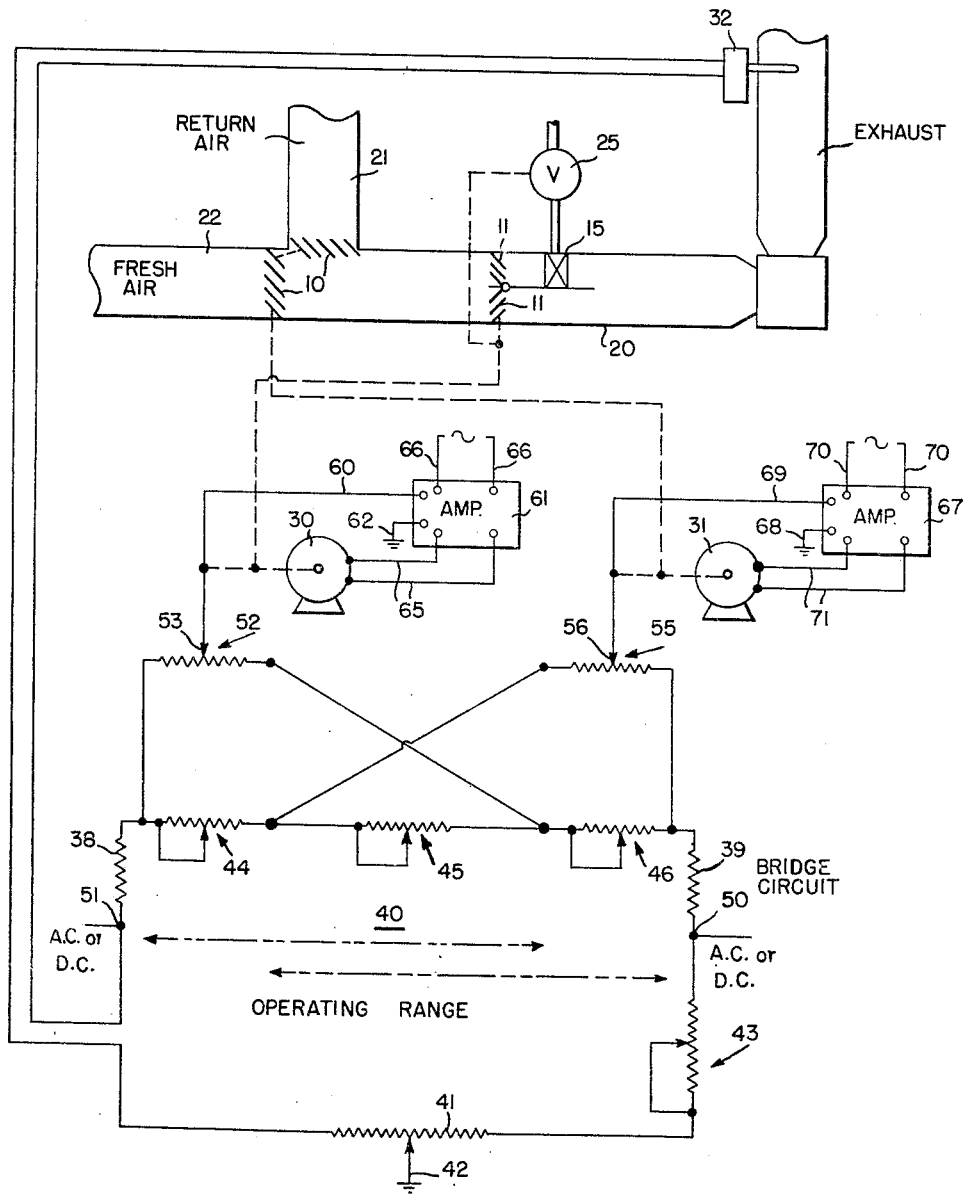

2,813,235

ELECTRIC CONTROL APPARATUS

Homer B. Clay, Minneapolis, Minn., assignor to Minneapolis-Honeywell Regulator Company, Minneapolis, Minn., a corporation of Delaware Application December 22, 1954, Serial No. 477,082

5 Claims. (Cl. 318—19)

My invention relates to electric control apparatus and more particularly to an improved electric motor control apparatus which incorporates a single electrical bridge network having a primary controller which adjustably controls through said network a plurality of motor controllers jointly and severally with adjustable overlapping operation between the motor controllers.

My improved electrical control apparatus utilizes a single bridge type network which includes a primary control or controllers which operate a pair of modulating motors or two stages of modulating controllers and in which the modulating controllers are interconnected such as to provide for ranges of selective individual operation and overlapping operation of the motors with the amount of overlap in operation being adjustable.

It is therefore the object of this invention to provide an improved motor control apparatus in which a single bridge type network controls a pair of modulating motors with an adjustable amount of overlapping operation between the motors which are controlled from a single controller.

Other objects will become apparent from the reading of the attached description together with the drawing which shows a schematic disclosure of my control apparatus as applied to an air conditioning system.

As shown in the drawing, my improved motor control apparatus is shown as applied to an air conditioning system and in particular to operation of a pair of dampers indicated at 10 and 11 in the drawing for controlling respectively the ratio of fresh and return air to be admitted to a duct and also the amount of air to be passed through the heat exchanger indicated at 15 in the duct. It will be evident that the damper 11 is a bypass damper positioned in the main stem of the ductwork indicated at 20 and operates to deflect a portion of the air received from the return branch indicated at 21 and the inlet fresh air branch indicated at 22 through the heat exchanger 15. The heat exchanger is fed by some heating or cooling medium which is valved to the heat exchanger by means of a valve indicated at 25 to modify the temperature of the air passing therethrough. For purposes of our disclosure, the operation of the valve and the bypass damper are simultaneously being operated by means of a mechanical connection from a motor indicated at 30. The damper 10 or dampers 10 are positioned in both of the ducts 21 and 22 and are operated jointly by means of a mechanical connection from the motor indicated at 31 to control the ratio of return air to fresh air to be admitted to the duct 20. Downstream of the heat exchanger and bypass damper is a discharge temperature sensor or temperature responsive resistor indicated at 32, this temperature sensor sensing the temperature of the air beyond the heat exchanger and the bypass damper which air is to be supplied to the space to be air conditioned. For purposes of simplicity, the plant supplying the heating medium and the circulator are omitted from the disclosure, this apparatus being largely conventional and forming no part of this particular invention.

The motors 30 and 31 controlling respectively the bypass and combined fresh air and return air dampers are controllably energized from the bridge network indicated generally at 40. This bridge network includes as its primary element the temperature sensor 32 which is positioned in one leg of the bridge along with an adjustable potentiometer 41 having a grounded wiper 42 and a second adjustable potentiometer 43 to make up one half of the bridge network. The potentiometer 41 serves as a calibrating potentiometer and its grounded wiper has a common output terminal for the bridge of a pair of output circuits to be later described. The resistor 43 is an adjustable balance resistor to balance the circuitry in accordance with the values of the temperature sensor 32.

The bridge network also includes as a second half fixed resistors 38, 39 and a plurality of adjustable resistor elements 44, 45 and 46 connected in series with one another and in parallel with the first mentioned half of the bridge across input diagonals indicated at 50 and 51 respectively to which an alternating current source of power is adapted to be applied. If desired, a direct current supply may be utilized. As shown in the drawing, there is connected across the resistors 44 and 45, that is in parallel therewith a motor balance potentiometer 52 having a wiper 53 which is mechanically coupled to the motor 30 and operated thereby. Also connected across the resistors 45 and 46 is a second motor balance potentiometer 55 whose wiper 56 is operatively connected to the motor 31 to be operated therewith in conjunction with the damper 10. Wiper 53 of the motor balance potentiometer 52 is electrically connected through a conductor 60 to one of the input terminals of an amplifier 61 the opposite input terminal being grounded at 62 to complete an output circuit with the grounded connection 42 and provide a first output circuit for the bridge network. Amplifier 61 is conventional in form and is shown here in block form for simplicity purposes, it being of the type that would controllably energize the operation of the motor 30 through electrical connections indicated at 65 and be in turn energized from the source of power indicated at 66. Inasmuch as the details of the motor and amplifier are conventional, they are omitted herein. Wiper 56 of motor balance potentiometer 55 is connected to an amplifier 67 through a conductor 69, the amplifier having a grounded input terminal 68 which completes a second output circuit for the bridge network 40 through the grounded connection 42 of potentiometer 41. Amplifier 67 like amplifier 61 is shown in block form and is of the type to controllably energize the motor 31 through suitable means such as electric circuitry indicated at 71 and in turn is energized from a source of power indicated at 70. The motor 31 as indicated above operates the potentiometer wiper 56 and also the damper 10 associated with the return and fresh air ducts of the air conditioning system.

While the details of the motors 30, 31 and the amplifiers 61, 67 have been omitted here it is to be understood that they are of the modulating type, the amplifiers being phase sensitive and energizing the motors associated therewith in proportion to the phase of the input signal and the magnitude of the input signal received from the output circuits described above. It should also be noted that the motors 30, 31 include built-in mechanical stops and these motors operate within limited ranges of movement commensurate with the movement of the potentiometer wipers 53, 56 on their associated windings 52 and 55 and to the degree sufficient to open and close the dampers 10 and 11 or move the same through their operating range. Thus the motors 30, 31 are adapted to be energized and may be driven to an extreme position if the input signal to their associated amplifiers are of sufficient magnitude wherein they will be stalled and will remain there until the direction of energization is reversed causing reversal of operation of the motor associated therewith.

As an example of how this type of plural modulating motor control is utilized, reference is made to the mechanical structure with which the motors are associated. It is intended with the disclosure above that the motor 31 operates the damper 10 to vary the ratio of return and fresh air between extremes in which fresh air portion of the damper 10 is completely closed and the return air portion is completely opened and to an extreme in which the fresh air damper is widely opened and the return air damper is substantially if not completely closed. In this particular apparatus, the ratio of fresh to return air will vary the range of temperature of the air directed to the heat exchanger portion of the duct with the bypass damper associated therewith. In the event that the bridge is in the condition of a call for heat, the bypass damper will be so positioned as to deflect all if not a major portion of the air through the exchanger. Under these conditions a damper 11 would be adjusted to a point where a minimum amount of fresh air would be admitted and a maximum amount of return would be admitted to the duct 20. As the requirements of the temperature sensor 32 is reversed, that is there is no call for heat, the bypass damper will be so positioned as to deflect the air beyond the heat exchanger bypassing the same and the damper 11 will be adjusted so that a maximum amount of fresh air will be directed in through duct 20 and a minimum amount of warmed return air will be admitted. At some stage between these extremes, it is desired that a certain amount of fresh air be admitted to the ductwork for ventilation purposes and a predetermined amount of return air be admitted to the ductwork inasmuch as this air is heated and will reduce the heating requirements on the heat exchanger. Similarly the amount of air being bypassed around the heat exchanger will be proportioned so that only a portion of the air in the duct 20 will be heated to give a resultant temperature of the air to be discharged to the space at a predetermined level. Thus it is necessary that the operation of motors 30 and 31 overlap over a given portion of their range of operation.

With the circuitry described above, it will be evident that the temperature sensor 32 positioned in the bridge which after adjustment of the calibrating potentiometer 41 and the balancing potentiometer or centering potentiometer 43 will cause the bridge network 40 to be unbalanced in one direction or in one sense or the other depending upon the change in the value of the resistance of the element 32. The resistors 44 and 46 associated with the balance potentiometers 52 and 55 are adjustable such as to vary the authority of the balancing potentiometers. It will be noted that resistor 45 is connected in common with and in parallel with each of the motor balance potentiometers and this resistor is also adjustable. Thus the voltage drop appearing across the balance potentiometers 52 and 55 while varying between differing levels of energization will have a certain portion of each potentiometer which is at the same voltage level. Thus for a condition of unbalance of the bridge caused by the temperature sensing resistor 32, it is possible that both motors will be energized and operating and in a position to balance or reach a balanced condition nullifying the output voltage in the output circuits described above at the same time. It will also be evident that for extreme variations of a temperature sensor 32, one or the other of the amplifiers 61, 67 will be energized with an extremely large output signal causing the motor associated therewith to drive the potentiometer connected thereto to an extreme position at which point the motor will stop in a stalled position maintaining the wiper fixed at this extremity of its potentiometer winding. Thus if the value of the resistance of temperature sensor 32 decreased appreciably, the bridge would be unbalanced in such a direction that the voltage output to the amplifier 67 would cause the motor 31 to operate to its extreme left hand position and stall at this point failing to balance the bridge network while the potentiometer 52 would be within the range of balance of the network and would energize its motor 30 to operate the wiper 53 to a balanced point at its extreme left end of the associated winding to balance the signal in the output circuit associated with the balance potentiometer 52 and energizing the motor 30. An extreme unbalance of the bridge or change in the value of the resistance of temperature sensor 32 to an appreciably high figure would cause the bridge network 40 to be unbalanced such that the potentiometer 55 would be within the range of balancing its output circuit and the bridge output circuit feeding the amplifier 61 would be energized to a level of energization such that the motor 30 would drive its wiper 53 to a right extremity of the winding of the potentiometer 52 wherein its motor would stall without balancing the bridge network. Depending upon the amount of resistance inserted into the circuit by the adjustment of the potentiometer 45, the range of overlap between the operation of the two motors may be adjusted. Thus if the resistor 45 were shunted out of the circuit completely, the motor 30 would operate range up to the midpoint of the unbalance of the circuit, assuming that all of the resistor values for the balance potentiometers and adjusting resistors being equal and the motor 31 would operate over the opposite half of the unbalance level of the bridge.

While I have shown my improved motor control apparatus as applied to an air conditioning damper control apparatus, it may be evident that the same may be utilized in connection with any type of equipment in which two stage overlapping modulating control is desired. It should also be evident that a number of primary controllers may be utilized in the bridge network in place of the temperature sensor 32, such as outside compensating temperature sensors together with different locations of the balancing resistors without departing from the scope of the invention. Therefore I wish to be limited only by the appended claims.

I claim as my invention:

1. Apparatus for controlling a plurality of controllers which jointly and severally control a condition, comprising, a bridge network including condition responsive resistor means and a calibrating potentiometer in series circuit therewith having a wiper forming a common output terminal in one half of said bridge network and a pair of follow-up potentiometers with a resistor in parallel therewith in the other half of the bridge network, means connecting the follow-up potentiometers with said resistor in parallel therewith in an overlapping relation, separate output circuits for said network connecting said follow-up potentiometers to said controllers and including said common output terminal in said one half of said bridge network, the operation of said controllers being independent of one another for wide extremes of variation of said condition and overlapping and simultaneous for small variations of said condition, and means for varying the value of the overlapped resistor in parallel with said follow-up potentiometers to vary the amount of overlapping operation of said controllers.

2. In control apparatus for an air conditioning system adapted to supply conditioned air to a space comprising, a plurality of controllers each controlling a factor which affects the condition of the air to be supplied to said space, an electrical bridge network having a plurality of output circuits which are connected to and controllably energize said plurality of controllers, resistance means included in said bridge network and responsive to the condition of the air to vary in value and unbalance said network upon a variation of said air from a normal condition, a plurality of balance means included in said network and connected respectively to said output circuits, a plurality of means each including a motive means which is electrically connected to one of said output circuits and controllably energized therefrom, each of said motive means being mechanically connected to one of said balance means and one of said controllers to position the same, means connecting said plurality of balance means in said network such that for an intermediate range of variation of the condition of said air from the normal condition all of said controllers will become operative and each of said balance means may produce a balance condition in its respective output circuits and for ranges of variations beyond said intermediate range of variation of said condition only one of said output circuits may be balanced by operation of its associated balance means.

3. In control apparatus for an air conditioning system adapted to supply conditioned air to a space comprising, a plurality of controllers each controlling a factor which affects the condition of air to be supplied to said space, an electrical bridge network having a plurality of output circuits which are connected to and controllably energize said plurality of controllers, resistance means included in said bridge network and responsive to the condition of the air to vary in value and unbalance said network upon a variation of said air from a normal condition, a plurality of balance means included in said network and connected respectively to said output circuit, a plurality of means each including a motive means which is electrically connected to one of said output circuits and controllably energized therefrom, each of said motive means being mechanically connected to one of said balance means and one of said controllers to position the same, means connecting said plurality of balance means in said network such that for an intermediate range of variation of the condition of said air from the normal condition all of said controllers will become operative and each of said balance means may produce a balance condition in its respective output circuits and for ranges of variation beyond said intermediate range of variation of said condition only one of said output circuits may be balanced by operation of its associated balance means, and adjustable means included in said network for varying the range of variations of said condition within which said plurality of balance means may each produce a balance in said output circuits.

4. In control apparatus for an air conditioning system adapted to supply conditioned air to a space comprising, a plurality of controllers each controlling a factor which affects the temperature of the conditioned air to be supplied to said space, an electrical bridge network having a plurality of output circuits which are connected to and controllably energize said plurality of controllers, temperature responsive resistor means responsive to the temperature of the conditioned air to be supplied to said space and included in said bridge network being variable in value to unbalance said network upon a variation of the temperature of said conditioned air from a normal condition, a plurality of balance means included in said network and connected respectively to said output circuit, a plurality of means each including a motive means which is electrically connected to one of said output circuits and controllably energized therefrom, each of said motive means being mechanically connected to one of said balance means and one of said controllers to position the same, means connecting said plurality of balance means in said network such that for an intermediate range or variation of temperature of said conditioned air from said normal condition or temperature each of said controllers will become operative and said plurality of balance means associated therewith may produce a balance condition in each of said output circuits and for ranges of temperature variations beyond said intermediate range only one of said controllers will become operative and the associated balance means may balance its output circuit.

5. In control apparatus for an air conditioning system adapted to supply conditioned air to a space comprising, a plurality of controllers each controlling a factor which affects the temperature of the conditioned air to be supplied to said space, an electrical bridge network having a plurality of output circuits which are connected to and controllably energize said plurality of controllers, temperature responsive resistor means responsive to the temperature of the conditioned air to be supplied to said space connected in said bridge network and variable in value to unbalance said network upon a variation of the temperature of said conditioned air from a normal condition, a plurality of balance means included in said network and connected respectively to each of said output circuits, a plurality of means each including a motive means which is electrically connected to one of said output circuits and controllably energized therefrom, each of said motive means being mechanically connected to one of said balance means and one of said controllers to position the same, means connecting said plurality of balance means in said network such that for an intermediate range or variation of temperature of said conditioned air from said normal temperature each of said controllers will become operative and said balance means associated therewith may produce a balance condition in each of said output circuits and for ranges of temperature variations beyond said intermediate range only one of said controllers will become operative and the associated balance means may balance its output circuit, and adjustable means included in said network and connected to said plurality of balance means for varying the range of temperature variation within which both of said controllers are operative and overlapping.

References Cited in the file of this patent

UNITED STATES PATENTS

| | | |
|---|---|---|
| 2,154,511 | Kingsland | Apr. 18, 1939 |
| 2,154,523 | Midyette | Apr. 18, 1939 |
| 2,612,628 | Hornfeck | Sept. 30, 1952 |
| 2,751,169 | Kutzler | June 19, 1956 |